US009109349B1

(12) United States Patent
Minton, Jr.

(10) Patent No.: US 9,109,349 B1
(45) Date of Patent: Aug. 18, 2015

(54) WATER MANAGEMENT SYSTEM AND METHOD

(71) Applicant: Millard M. Minton, Jr., Gloucester, VA (US)

(72) Inventor: Millard M. Minton, Jr., Gloucester, VA (US)

( * ) Notice: Subject to any disclaimer, the term of this patent is extended or adjusted under 35 U.S.C. 154(b) by 92 days.

(21) Appl. No.: 13/834,309

(22) Filed: Mar. 15, 2013

(51) Int. Cl.
*F16K 17/00* (2006.01)
*E03B 7/07* (2006.01)

(52) U.S. Cl.
CPC ..................................... *E03B 7/071* (2013.01)

(58) Field of Classification Search
CPC ........................................................ E03B 7/04
USPC ......... 137/456, 457, 458, 459, 468, 552, 596, 137/625.17, 460
See application file for complete search history.

(56) References Cited

U.S. PATENT DOCUMENTS

| | | | | |
|---|---|---|---|---|
| 4,522,229 A * | 6/1985 | Van de Moortele | ........... | 137/460 |
| 5,004,014 A * | 4/1991 | Bender | ..................... | 137/624.12 |
| 5,113,892 A * | 5/1992 | Hull et al. | ....................... | 137/62 |
| 5,161,563 A * | 11/1992 | Thompson | .......................... | 137/1 |
| 5,287,876 A * | 2/1994 | Takahashi | ........................ | 137/62 |
| 5,347,264 A | 9/1994 | Björkman | ..................... | 340/611 |
| 5,441,070 A * | 8/1995 | Thompson | .......................... | 137/1 |
| 5,636,653 A | 6/1997 | Titus | ................................ | 137/14 |
| 5,708,195 A | 1/1998 | Kurisu et al. | ................... | 73/40.5 |
| 6,317,051 B1 | 11/2001 | Cohen | ........................... | 340/603 |
| 6,321,773 B1 * | 11/2001 | Ramsby | ........................ | 137/209 |
| 6,439,260 B1 * | 8/2002 | Shuff | ............................ | 137/457 |
| 6,532,979 B1 * | 3/2003 | Richter | ............................. | 137/1 |
| 7,032,435 B2 * | 4/2006 | Hassenflug | ....................... | 73/46 |
| 7,057,507 B1 * | 6/2006 | Sandifer | ........................ | 340/531 |
| 7,174,771 B2 * | 2/2007 | Cooper | ...................... | 73/40.5 R |
| 7,306,008 B2 | 12/2007 | Tornay | ..................... | 137/624.11 |
| 7,574,896 B1 * | 8/2009 | Cooper | ...................... | 73/40.5 R |
| 7,900,647 B2 | 3/2011 | Tornay | ......................... | 137/15.11 |
| 7,966,099 B2 * | 6/2011 | Fima | ............................. | 700/276 |
| 2002/0088491 A1 * | 7/2002 | Yanagisawa et al. | ......... | 137/456 |
| 2009/0242054 A1 * | 10/2009 | Groen et al. | .............. | 137/625.17 |

* cited by examiner

*Primary Examiner* — John K Fristoe, Jr.
*Assistant Examiner* — Umashankar Venkatesan
(74) *Attorney, Agent, or Firm* — Blake P. Hurt; Tuggle Duggins P.A.

(57) ABSTRACT

A water management system for reducing the damage caused by leaks in a structure including a manifold having first and second electronic valves and connected to a supply line. The system also includes a purge line and a connection line attached to the manifold as well as a requesting member with an activating member affixed thereto and a transmitter positioned proximal that signals the first electronic valve to open when the activating member is engaged. A method of using the system to reduce flooding risks in a structure is also disclosed.

13 Claims, 4 Drawing Sheets

WATER MANAGEMENT SYSTEM AND METHOD

FIELD OF THE INVENTION

The invention herein pertains to water preservation and particularly pertains to an electronic water management system utilizing wireless transmitters in communication with electronic valves at a manifold to restrict the flow of unnecessary water into a structure to limit leak damage.

DESCRIPTION OF THE PRIOR ART AND OBJECTIVES OF THE INVENTION

Water leaks in homes and businesses cause a tremendous amount of expense and damage to the structure. Leaks can occur in numerous places throughout a home or office, often in locations that are inaccessible or undetectable by an occupant. Leaks of this kind can cause significant damage even if it discovered quickly, but the longer the leak exists, the greater the damage may be.

Pipes are typically connected to a main water supply line and under constant pressure. In a conventional structure, pipes maintain a full volume of water within the plumbing, even when there is no need for water by a user. Consequently, any leak that develops in the plumbing has the potential to release the full volume of water held by the plumbing system, even if the water supply is cut off. A more likely scenario is that the leak is not detected immediately and water continues to release out of the plumbing system and cause damage.

Many methods exist to limit water damage to a structure. By limiting the flow of water through interior plumbing, the overall risk of leaks is reduced. For example, U.S. Pat. Nos. 7,306,008 and 7,900,647 (incorporated by reference in their entireties herein and owned by the instant inventor) disclose a system and method for detecting and preventing leaks that shut off a water supply when a drop in pressure in the pipes is detected. However, the system does not address the water that has already passed through the system and into a home or office. Even modestly sized structures can store significant amounts of water between, for example a main water pipe and a faucet which can cause damage even if the water supply is shut off at the main.

Thus, in view of the problems and disadvantages associated with prior art water management systems and methods, the present invention was conceived and one of its objectives is to provide a water management system to reduce the damage caused by interior leaks in a structure.

It is another objective of the present invention to provide a water management system using wireless transmitters to request water at a particular destination.

It is still another objective of the present invention to provide a first electronic valve positioned at a manifold to communicate with the wireless transmitters for controlling the flow of water to a particular destination.

It is yet another objective of the present invention to provide a controller for displaying water pressure and temperature in structure plumbing.

It is a further objective of the present invention to provide a second electronic valve positioned at the manifold to open in the event a purge is needed.

It is still a further objective of the present invention to provide a water management system that is easy to install during new construction or remodeling.

It is yet another objective of the present invention to provide a water management system that continuously monitors plumbing integrity to reduce the ecological impact of leaks.

It is another objective of the present invention to provide a manifold with a first and second electronic valves in communication with a controller to manage water entering a structure purging water therefrom.

It is still a further objective of the present invention to provide a manifold defining first and second front ports for housing first and second electronic valves.

It is another objective of the present invention to provide a manifold with first and second side ports for use in channeling fluids to and from a structure.

It is yet a further objective of the present invention to provide a method of using a water management system to reduce the damage caused by leaks in a structure.

It is a further objective of the present invention to provide a method of terminating water flow through a structure when water is not needed or requested.

It is still further an objective of the present invention to provide a method for purging existing water in plumbing after an unanticipated drop in water temperature or pressure.

Various other objectives and advantages of the present invention will become apparent to those skilled in the art as a more detailed description is set forth below.

SUMMARY OF THE INVENTION

The aforesaid and other objectives are realized by providing a water management system for substantially reducing the damage caused by leaks inside a structure. This system includes a manifold with first and second electronic valves. The manifold is connected to the main water supply and feeds a connection line which provides water to the structure. The system also includes a requesting member such as a faucet with a flow sensor attached to the connection line and an activation member such as a handle with a transmitter positioned nearby. When water is requested, the handle is turned and the transmitter communicates with the first electronic valve to allow water to flow from the main water supply through the manifold and the connection line where it exits the faucet. A manifold for use in the water management system is also included. The manifold has a front, a rear, a pair of opposing longitudinal side walls, and a pair of opposing lateral side walls. The pairs of opposing longitudinal and lateral side walls are attached at opposing ends to the front and the rear, respectively. The top defines a first front port and a second front port while one of the longitudinal side walls forms a first side port and one of said lateral side walls defines a second side port, the front and side ports serving as fluid channels for fluids such as water entering the structure.

A method of using a water management system to reduce damage caused by leaks in a structure is also provided. The method includes the steps of providing the aforementioned system, engaging the activation member, for example by turning the faucet handle, transmitting the water request to the first electronic valve positioned at the manifold, and opening the first electronic valve to permit water to flow into the structure.

DETAILED DESCRIPTION OF THE PREFERRED EMBODIMENTS AND OPERATION OF THE INVENTION

Figure 1:
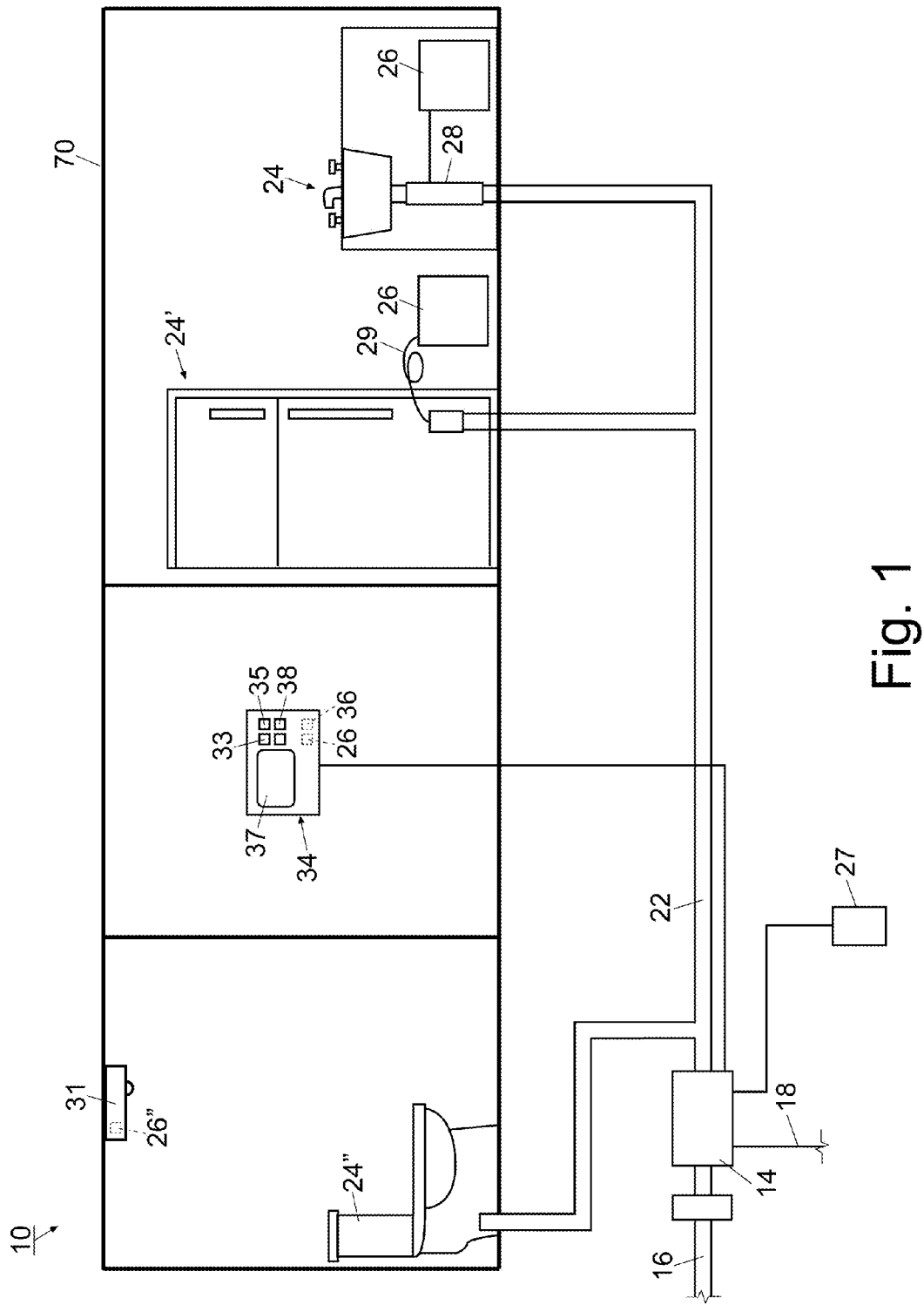
FIG. 1 shows a schematic view of a water management system for reducing the risk of flooding in a structure.

For a better understanding of the invention and its operation, turning now to the drawings, FIG. 1 shows a schematic representation of preferred water management system 10 for reducing damage caused by leaks in structure 70. Structure 70 may be a commercial or residential building with hot and cold water pipes such as connection line 22 extending throughout.

Figure 2:
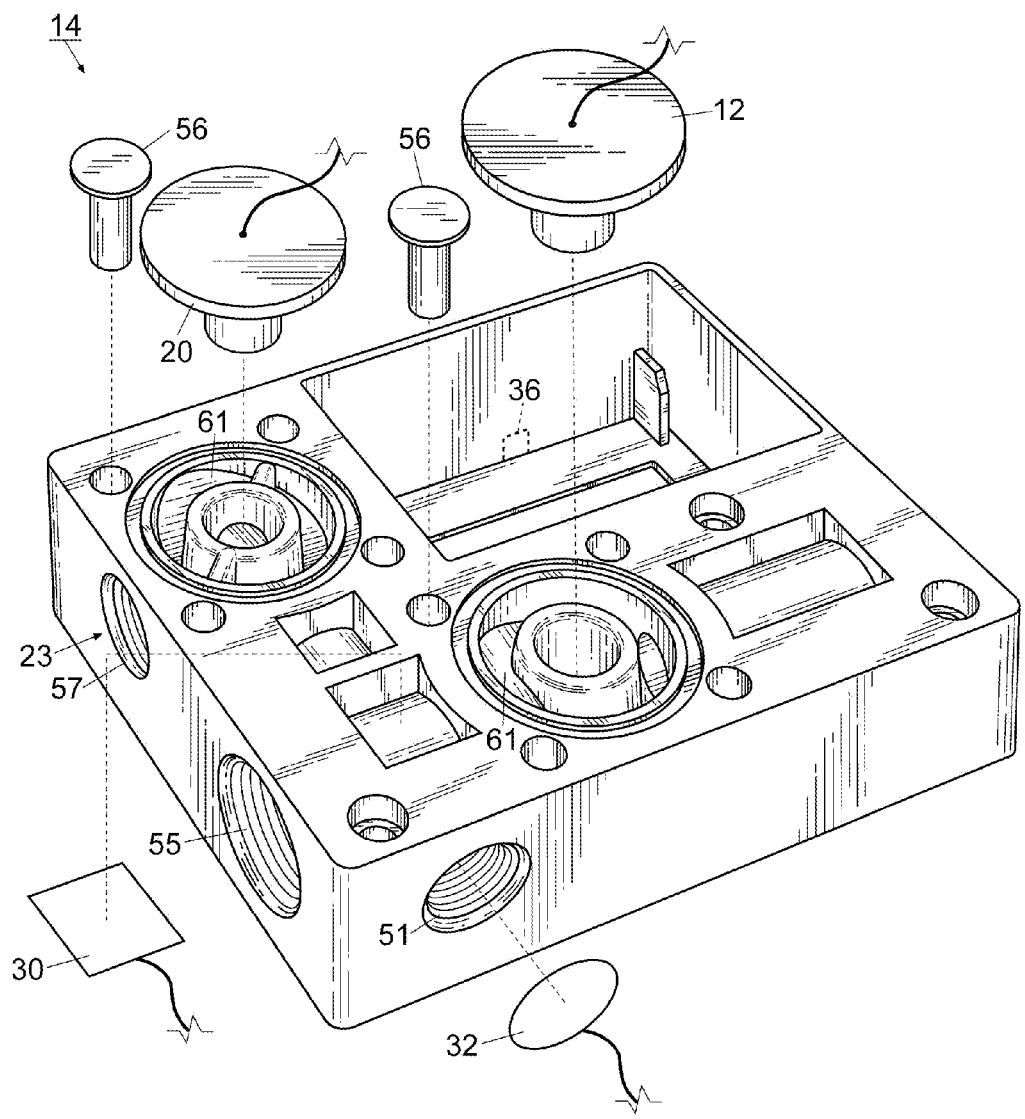
FIG. 2 pictures an elevated side perspective view of a manifold block as shown in FIG. 1.

Water management system 10 avoids damaging and costly leaks by greatly reducing both the available water in the event of a leak and the likelihood of a leak developing. Instead of water entering structure 70 in supply line 16 as is conventional, supply line 16 is connected to manifold 14, preferably outside or removed from structure 70. Manifold 14 as seen in FIG. 2 includes first electronic valve 12 which is in the closed position as a default, preventing water from reaching connection line 22. First electronic valve 12 may be any configuration of electro-mechanical valve but preferably is a twelve volt (12 v) solenoid water valve attached to manifold 14.

In addition to preventing leak damage, preferred water management system 10 also lessens the ecological impact of leaky plumbing by constantly monitoring plumbing system integrity. By alerting a user of a purge event, system 10 not only prevents leak damage but also notifies the user of small, potentially unnoticed leaks. Over time, these leaks not only increase the risk of damage to a structure and contents but also cost substantial amounts of money in the form of increased utility bills. Further, unchecked leaks waste large volumes of water every year, water that could be better and more efficiently used to lessen man's ecological impact on the environment.

When a user (not shown) demands water at requesting member 24, activating member 28 is engaged, for example by turning a handle or pushing a button, which allows residual water to pass through activating member 28 and completes a circuit causing transmitter 26 to communicate a signal to receiver 36 to open first electronic valve 12. Preferred activating member 28 is a flow valve connected to a conventional reed switch flow sensor with a default in the open position. When water is requested at requesting member 24, the circuit is completed and electricity reaches transmitter 26, transmitting the water authorization signal.

Water flows through manifold 14, into connection line 22, and exits at requesting member 24. Requesting member 24 may be a faucet, a shower, a dishwasher, a toilet, a refrigerator, or any other device or appliance that uses water, but for the sake of brevity requesting member 24 will be shown in FIG. 1 as a sink faucet while requesting member 24' will be represented as a refrigerator and requesting member 24" is represented as a toilet. Requesting member 24' further includes appliance interface cable 29 which attaches directly to the solenoid (not shown) found in nearly all water-using appliances. When requesting member 24' requires water, residual water flow activates the solenoid of interface cable 29 which in turn powers transmitter 26 associated therewith to communicate a signal to open first electronic valve 12 and permit water to flow.

Preferred water management system 10 may also include water activator sensor 31. Water management system 10 may be retrofitted near existing appliances and plumbing in addition to being installed in new construction. Some requesting members 24, 24', 24" have less accessible connection points for the installation of activation member 28, for example showers, bath tubs, and some toilets. In these instances, water activator sensor 31 may serve the role of activation member 28 and remotely communicate with manifold 14 when water is desired. Preferred water activator sensor 31 has a Fresnel lens protecting a micro-controlled passive infra-red detector for detecting movement and a micro-controlled microphone for detecting sound (not shown).

When a user enters an environment such as a bathroom, water activator sensor 31 detects the user's movement and transmits a signal to manifold 14 to open first electronic valve 12 and allow water to flow through connection line 22 and into for example, a bath tub, sink or toilet 24". Should the user not activate a handle or button for the associated requesting member and the expected water does not flow through manifold 14 within a predetermined amount of time, controller 34 then signals manifold 14 to close first electronic valve 12. Should the user turn the handle on for example to the bath tub, manifold 14 would signal electronic valve 12 to open allowing water to flow as desired until the handle is turned off. Once the handle is off, a signal is sent to close valve 12 thus discontinuing the flow of water through manifold 14.

Alternatively, if a user remains stationary and silent, for example while soaking in the bath tub, for a period longer than the predetermined period of time, the user may make a series of noises, for example a repeated clapping of the hands, to activate sensor 31 to re-engage valve 12 and allow water to flow through manifold 14 and connection line 22 to the tub whereby the handle can be turned on and water will again flow into the tub. Although water activator sensor 31 may use a passive infra-red detector for detecting movement and a micro-controlled microphone for detecting sound, alternate embodiments of water activator sensor 31 may employ other methods of detecting movement, sound, or other stimuli in a given area.

When water is no longer needed at requesting members 24 or 24', activation member 28 is disengaged, either by opening of the reed switch flow sensor (for example from turning a faucet handle) or communicated from the solenoid (for example by pressing a button), and a signal is communicated to first electronic valve 12 to close. By terminating the flow of water at manifold 14 and requesting members 24, 24' instead of solely at requesting members 24, 24' as is conventional, no additional water is available in the event a leak develops in connection line 22.

Although additional water is prevented from leaking into structure 70 during a leak, there is still a substantial volume of water in connection line 22 after first electronic valve 12 is closed. As seen in FIG. 2, preferred water management system further includes second electronic valve 20, temperature sensor 30, and pressure sensor 32 for taking measurements of water pressure and temperature within manifold 14 or connection line 22. When the pressure in connection line 22 drops and no requesting member 24, 24', 24" is involved, water management system 10 determines that there is a leak in the system. A signal is sent from controller 34 to second electronic valve 20 to open, purging the residual water within connection line 22 and any plumbing tributaries (not shown). Because first electronic valve 12 is shut, no additional water is permitted to enter from connection line 22 into structure 70 until system 10 is reset, thus significantly reducing the volume of damaging water capable of escaping connection line 22 or other tributary within structure 70 during a leak.

Temperature sensor 30 and pressure sensor 32 may be conventional contact sensors positioned in connection line 22 or requesting members 24, 24' but preferably are located at manifold 14 (FIG. 2). Although sensors 30 and 32 may be wired to controller 34, preferable temperature sensor 30 and pressure sensor 32 include a wireless transmitter (not shown) to communicate wirelessly with controller 34 mounted within structure 70. Preferable controller 34 is an electronic device having display screen 37, reset button 33, purge button 35, and mute button 38.

Controller 34 may be wired to first electronic valve 12, second electronic valve 20, activating member 28, temperature sensor 30, and pressure sensor 32 but preferably is in wireless communication with respective components 12, 20, 28, 30, and 32. Controller 34 may also include a notification, for example an audible alarm to alert a user to a drop in water temperature or pressure within system 10. Further, preferred controller 34 includes circuitry (not shown) for programming and storing information about water management system 10, for example the average volume of water requested by requesting member 24, 24' or 24" or the average duration of water use by a particular requesting member. By programming and storing information like these examples, water management system 10 becomes increasingly efficient in predicting when a particular request of water is legitimate, and when a malfunction in the system or a leak has occurred.

Upon perceiving the audible notification, mute button 38 may be pressed by a user, for example if the drop in water pressure was anticipated, inadvertent or was otherwise being addressed. In the alternative, purge button 35 may be pressed in the event that a leak has been detected or the water in connection line 22 is near freezing. Pressing purge button 35 communicates a signal to first electronic valve 12 to close (if it is open) or remain closed and second electronic signal 20 to open, venting water out of structure 70, and more specifically through hot water return 23 and first top side port 55 attached to second top side wall port 57 and out right longitudinal side wall port 52. System 10 will remain in this configuration with first electronic valve 12 closed and second electronic valve 20 open until a user presses reset button 33 and system 10 resumes operation, allowing first electronic valve 12 to open. Alternatively, controller 34 may be programmed to close second electronic valve 20 after a predetermined period of time following a purge event.

In an alternate embodiment, preferred controller 34 may be programmed to take some or all of the steps as previously described without the input of a user, for example if no user was present to engage purge button 35. In this embodiment, water management system 10 can purge the potentially damaging water before it leaks out into structure 70. Controller 34 may also be programmed to signal a visual alert at display screen 37 or an audible alert to inform the user that a purge event has taken place.

Figure 6:
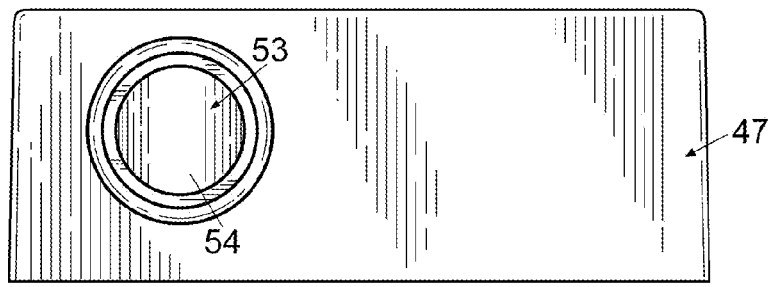
FIG. 6 features a bottom side plan view of the manifold block of FIG. 2.
Figure 7:
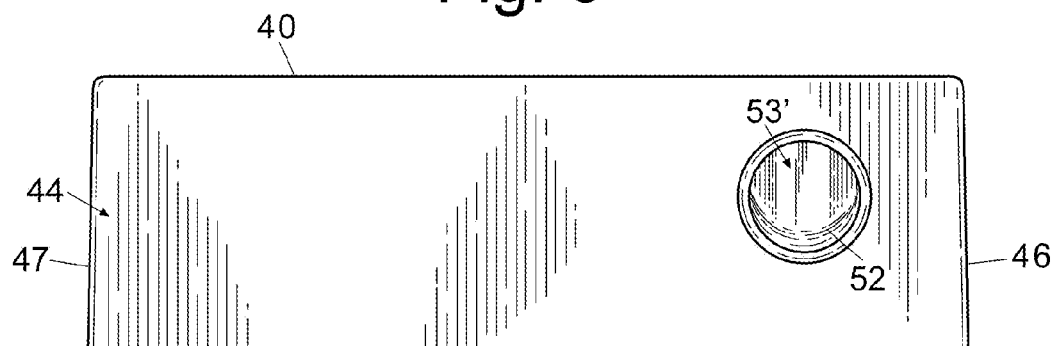
FIG. 7 shows a right side elevational view of the manifold block of FIG. 2.
Figure 8:
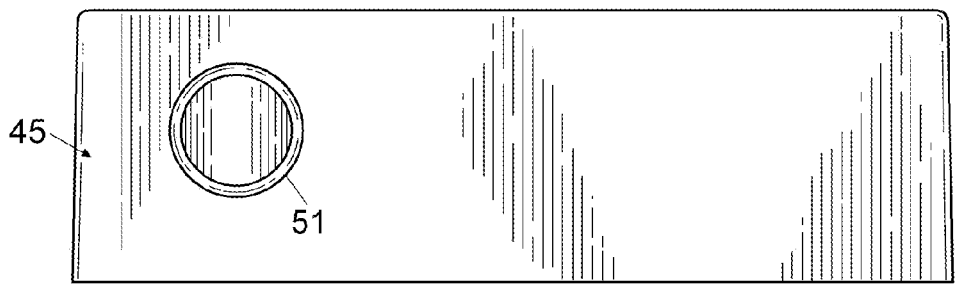
FIG. 8 illustrates a left side elevational view of the manifold block of FIG. 2.

Manifold 14 is shown in greater detail in FIGS. 2-8. FIG. 2 is a side elevated perspective view of preferred manifold 14. Preferred manifold 14 is a rectangular prism defining front side (FIG. 3), rear side 42 (FIG. 4), top side wall 46 (FIG. 5), bottom side wall 47 (FIG. 6), right longitudinal side wall 44 (FIG. 7), and left longitudinal side wall 45 (FIG. 8). Although preferred manifold 14 is cuboid, other embodiments of manifold may define substantially different shapes to accommodate different plumbing systems, water main connection types, or additional electronic valves and associated ports. Describing components such as "right", "left", "top", and "bottom" are used for ease of identifying similar structures and are not intended to limit the scope of the instant invention.

Figure 3:
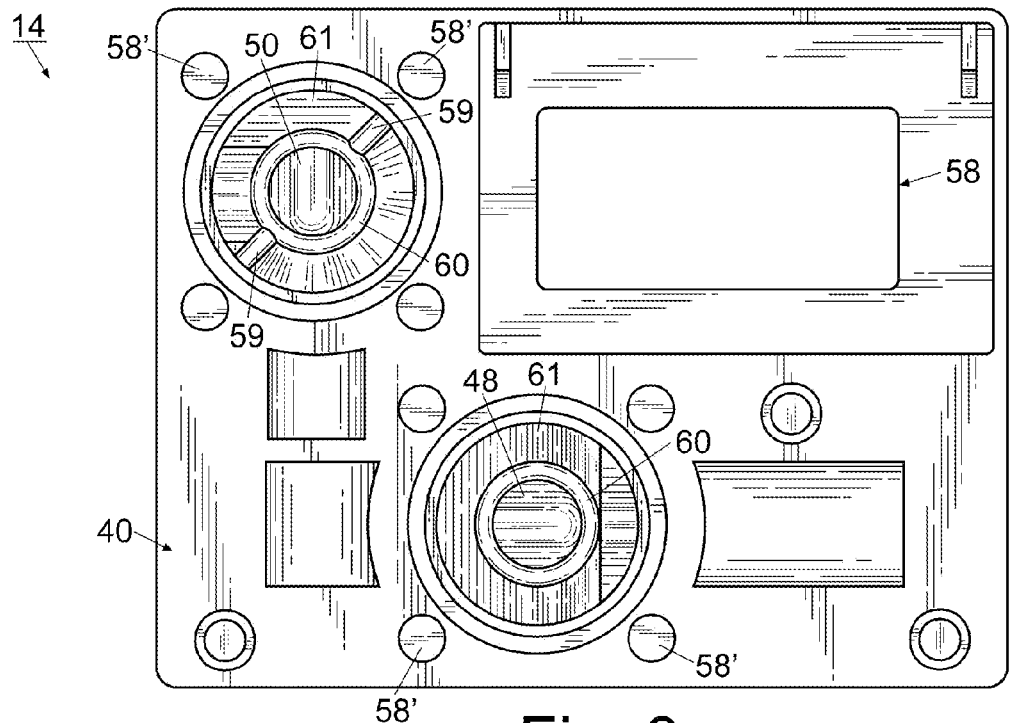
FIG. 3 depicts a front plan view of the manifold block of FIG. 2.
Figure 4:
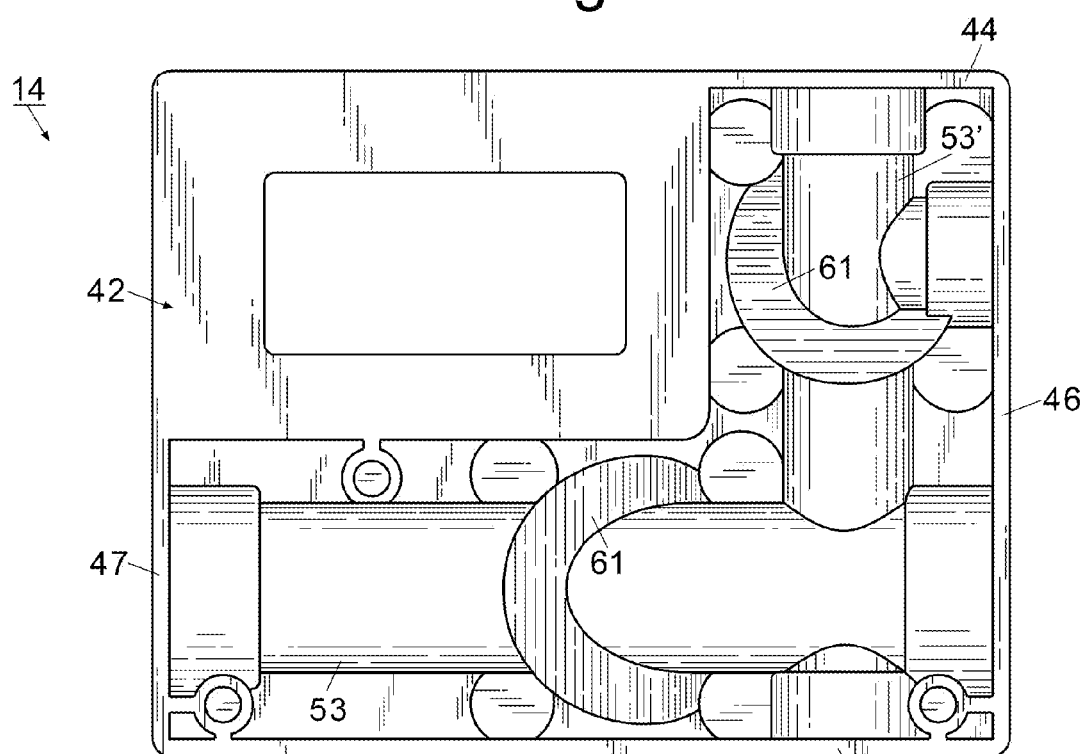
FIG. 4 demonstrates a rear plan view of the manifold block of FIG. 2.

FIGS. 3 and 4 illustrate the front and rear plan views, respectively of manifold 14. Manifold front 40 preferably defines first front port 48 and second front port 50 sized to engage respectively first electronic valve 12 and second electronic valve 20 as illustrated in FIG. 2. Although first and second front ports 48, 50 define circular openings, the figures are not intended to limit the shape of ports 48 and 50, and it is contemplated that the respective ports 48, 50 may assume any configuration necessary to engage the associated electronic valves 12, 20. Each port 48, 50 may also include port ridge 60 which circumscribes first and second ports 48, 50 and provides additional engagement surface for first and second electronic valves 12, 20 respectively. Second front port 50 may further include bars 59 which prevent water from inadvertently flowing past second electronic valve 20 when a purge has not been requested.

Manifold front 40 preferably defines aperture 58 which may house power supply 27 (FIG. 1), receiver 36 (FIG. 2), and circuitry (not shown) for communicating with controller 34. Receiver 36 may be located in close proximity to electronic valves 12 and 20 so that electronic communication is quick and efficient when commands from controller 34, activating member 28 or activator sensor 31 are received. Power supply 27 is preferably a conventional battery but may embody any means of powering the components of manifold 14 in alternate embodiments such as a rechargeable battery, AC, or DC connectivity.

Manifold front 40 may also define a plurality of apertures 58'. Fasteners (not shown) may be used to secure first and second electronic valves 12, 20 to resist high fluid pressure which may be encountered during operation. Conventional fasteners may include screws, bolts, or other appropriate hardware and apertures 58' may be sized to receive fasteners.

Figure 5:
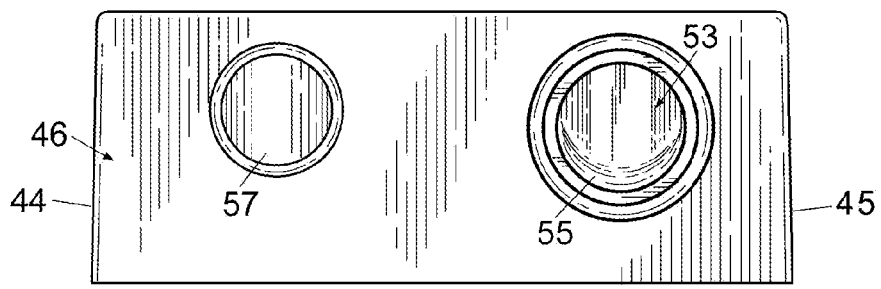
FIG. 5 illustrates a top side plan view of the manifold block of FIG. 2.

FIGS. 5 and 6 illustrate respectively top and bottom side walls 46, 47 of manifold 14. When manifold 14 is positioned vertically, top side wall 46 is above bottom side wall 47 but this orientation is not intended to limit the location of first and second top side wall ports 55, 57, first bottom side wall port 54, or first longitudinal side wall port 52 (FIG. 7). Preferably, bottom side wall port 54 has a circumference commensurate with supply line 16 which carries the entire water supply for structure 70 therethrough. First and second top side wall ports 55, 57 may have the same circumference as bottom side wall port 54, or the circumference may be increased or decreased to compensate for desired flow pressure or adjustments in volume. Bottom side wall port 54 and opposing first top side wall port 55 are connected and in fluid communication via channel 53 which may run linearly or non-linearly between ports 54, 55. Like the circumference of ports 54, 55, the circumference of channel 53 may be consistent throughout the length of manifold 14, or it may increase or decrease to increase or decrease available water pressure.

FIGS. 7 and 8 show respectively right side and left side elevational views of manifold 14. Right longitudinal side wall 44 in FIG. 7 defines first longitudinal side wall port 52 which preferably is located closer to top side wall 46 than bottom side wall 47. First longitudinal side wall port 52 may be in fluid communication with top side wall port 55 via channel 53'. Alternatively, second top side wall port 57 and first longitudinal side wall port 52 may be connected and in fluid communication through channel 53' which may or may not be in fluid communication with channel 53. Left longitudinal side wall 45 is not illustrated as defining any fluid ports, but in one or more alternate embodiments of manifold 14, left longitudinal side wall 45 may define one or more side wall ports similar to first side wall port 52. Further, left longitudinal side wall 45 defines sensor aperture 51 sized to receive pressure sensor 32 (FIG. 2) which is preferably threaded in order to secure not only sensor 32 but also a plug (not shown) therein.

FIGS. 3-8 demonstrate that preferable manifold 14 may not define a perfect rectangle but rather includes rear 42 which is slightly larger than front 40. This causes right and left longitudinal side walls 44, 45 and top and bottom side walls 46, to angle slightly as they join rear 42 to front 40 at opposing ends. While preferred manifold 14 defines a trapezoidal shape, alternative embodiments of manifold 14 may define any number of shapes and orientations.

FIGS. 2, 3, and 4 illustrate preferred ports 48 and 50 may each define ramps 61 to assist in the effective and efficient operation of first and second electronic valves 12, 20. As shown in FIGS. 3 and 4, water entering through either bottom side wall port 54 of manifold 14 from supply line 16, first top side port 55 from connection line 22, or warm water return 23 encounters a sloped surface of ramp 61, depending on which direction the water is flowing. The water ascends up the sloped surface until it encounters first or second electronic valves 12, 20. If the valve is closed, the water stops, but when the valve opens, the water spills down into first or second front ports 48 or 50 and continues on through channels 53 or 53' (FIG. 4). Bars 59 may further aid in preventing inadvertent water flow in the event second electronic valve 20 does not form a tight fit over second top port 50.

A method of using water management system 10 to reduce the likelihood of damaging leaks within a structure is also provided. The preferred method to reduce leaks includes the steps of providing manifold 14 with first and second electronic valves 12, 20, supply line 16 and purge line 18 connected via first side wall port 52 to manifold 14, water requesting member 24 with activation member 28 affixed thereto, transmitter 26 positioned proximate requesting and activating members 24, 28, connection line 22 connecting requesting member 24 to manifold 14, and controller 34 in communication with transmitter 26 and first and second electronic valves 12, 20. The preferred method may further comprise the steps of engaging activation member 24 to request water, for example by turning a faucet handle, flushing a toilet, or pressing a start button, transmitting the request to first electronic valve 12, and opening first electronic valve 12 to permit water flow, for example, from supply line 16 through manifold 14, connection line 22 and to requesting member 24.

The method includes the steps of releasing or ceasing the engagement of activation member 24, for example by turning a handle, pressing a button, or simply allowing a predetermined period of time to lapse and closing first electronic valve 12 to prevent additional water from entering the plumbing of structure 70. The method may also include the steps of communicating with second electronic valve 20 by controller 34, closing first electronic valve 12, opening second electronic valve 20, and purging water from connection line 22 through channels 53, 53' and exiting purge line 18. The method may further comprise the steps of providing water management system 10 with temperature sensor 30 and pressure sensor 32, programming controller 34 with predetermined periods of time for expected water flow or predetermined volume levels, and terminating water flow at first electronic valve 12 when these values are exceeded.

The method may also include the steps of determining pressure in connection line 22 with pressure sensor 32, communicating the pressure value to controller 34, comparing the pressure value to a predetermined threshold, for example one hundred pounds per square inch (100 psi), closing first electronic valve 12 when the pressure value fails to exceed the predetermined threshold, and opening second electronic valve 20 to purge connection line 22. In a similar manner, the method may further comprise the steps of determining temperature in connection line 22 with temperature sensor 30, communicating the temperature value to controller 34, comparing the temperature value to a predetermined threshold, for example thirty five degrees Fahrenheit (35° F. or approximately 1.5° C.), closing first electronic valve 12 when the temperature value fails to exceed the predetermined threshold, opening second electronic valve 20 to purge connection line 22. These steps prevent pipes from bursting and water leaks from going undetected for an extended period of time.

The illustrations and examples provided herein are for explanatory purposes and are not intended to limit the scope of the appended claims.

I claim:

1. A water management system for reducing damage caused by leaks in a structure, said system comprising: a first electronic valve, a manifold, having a front defining a plurality of apertures, a rear, a pair of opposing longitudinal side walls, a pair of opposing lateral side walls, said front and said rear attached at opposing ends of each of said side longitudinal and lateral walls, said front defining a first front port and a second front port, one of said longitudinal side walls defining a first side port, said first electronic valve positioned within said first front port, a second electronic valve positioned within said second front port, one of said lateral side walls defining a first top side port, each of said ports in fluid communication with one another, said first and second front ports each defining an interior port ridge and an annular ramp, said annular ramp circumscribing said port ridge in a descending manner, such that said ramp surface is angled relative to said manifold face, said second front port including one or more bars that extend radially from the center of said second front port, a supply line, said supply line attached to said manifold at said first electronic valve, a purge line, said purge line affixed to said second electronic valve, a connection line, said connection line attached to said manifold, an activating member, a requesting member, said activating member affixed to said requesting member, said requesting member
connected to said connection line, a transmitter, said transmitter positioned proximate said activating member, a controller with a display screen and purge button, said controller in communication with said first electronic valve, said second electronic valve, and said transmitter, wherein engaging said activating member causes said transmitter to communicate with said first electronic valve, permitting water to flow from said supply line to said requesting member, and wherein engaging said purge button causes said controller to communicate with said second valve, permitting water to drain out of said supply line.

2. The system of claim 1 further comprising a first sensor, said first sensor for measuring pressure in said connection line.

3. The system of claim 1 further comprising a second sensor, said second sensor for measuring temperature in said connection line.

4. The system of claim 1 wherein said transmitter is a wireless transmitter.

5. The system of claim 1 wherein said manifold is positioned exterior said structure.

6. The system of claim 1 further comprising a receiver, said receiver positioned proximal said manifold, said receiver in communication with said controller.

7. A method of reducing damage caused by leaks within a structure, the method comprising the steps of:
   a) providing the water management system of claim 1;
   b) engaging the activation member to request water;
   c) transmitting the request to the first electronic valve; and
   d) opening the first electronic valve to permit water flow.

8. The method of claim 7 further comprising the steps of:
   a) ceasing the engagement of the activation member; and
   b) closing the first electronic valve.

9. The method of claim 7 further comprising the steps of:
   a) communicating with the second electronic valve via the controller;
   b) closing the first electronic valve;
   c) opening the second electronic valve; and
   c) purging water from the connection line.

10. The method of claim 7 wherein the step of providing a water management system further comprises providing a pressure sensor and a temperature sensor for monitoring the connection line.

11. The method of claim 10 further comprising the steps of:
    a) determining a pressure value in the connection line;
    b) communicating the pressure value to the controller;
    c) comparing the pressure value to a predetermined threshold;
    d) closing the first electronic valve when the pressure value fails to exceed the predetermined threshold; and
    e) opening the second electronic valve to purge the connection line.

12. The method of claim 10 further comprising the steps of:
    a) determining a temperature value in the connection line;
    b) communicating the temperature value to the controller;
    c) comparing the temperature value to a predetermined threshold;
    d) closing the first electronic valve when the temperature value fails to exceed the predetermined threshold; and
    e) opening the second electronic valve to purge the connection line.

13. The method of claim 10 further comprising the steps of:
    a) communicating pressure and temperature values to the controller; and
    b) displaying the pressure and temperature values at the controller.

* * * * *